(12) United States Patent
Leonard et al.

(10) Patent No.: US 12,602,191 B2
(45) Date of Patent: Apr. 14, 2026

(54) STORING DATA ON MULTI-LEVEL CELL MEMORY CELLS

(71) Applicant: Micron Technology, Inc., Boise, ID (US)

(72) Inventors: Roy Leonard, San Jose, CA (US); Dave Holmstrom, Los Gatos, CA (US); Joseph L. Turmes, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/894,203

(22) Filed: Sep. 24, 2024

(65) Prior Publication Data

US 2026/0086741 A1     Mar. 26, 2026

(51) Int. Cl.
*G06F 3/06* (2006.01)

(52) U.S. Cl.
CPC .......... *G06F 3/0679* (2013.01); *G06F 3/0604* (2013.01); *G06F 3/0655* (2013.01)

(58) Field of Classification Search
CPC ..... G06F 3/0679; G06F 3/0604; G06F 3/0619
See application file for complete search history.

(56) References Cited

U.S. PATENT DOCUMENTS

2018/0143876 A1* 5/2018 Yang ...................... G11C 29/52
2025/0165181 A1* 5/2025 Mizukoshi ............ G06F 3/0679

* cited by examiner

*Primary Examiner* — Jane W Benner
(74) *Attorney, Agent, or Firm* — Schwegman Lundberg & Woessner, P.A.

(57) ABSTRACT

This disclosure is directed to a system for high efficiency storage in high capacity non-volatile solid state applications. The system includes a memory device and a processing device operatively coupled to the memory device. The processing device performs operations including receiving a request to program data, storing the data by default in a first type of storage with multi-level memory cells having a first number of levels, and bypassing a second type of storage with fewer levels. Upon detecting a condition, the processing device transfers the data to a third type of storage with a greater number of levels than the first type. This method optimizes storage efficiency and performance by dynamically managing data storage based on the portion of user logical block addresses that contain user data.

20 Claims, 4 Drawing Sheets

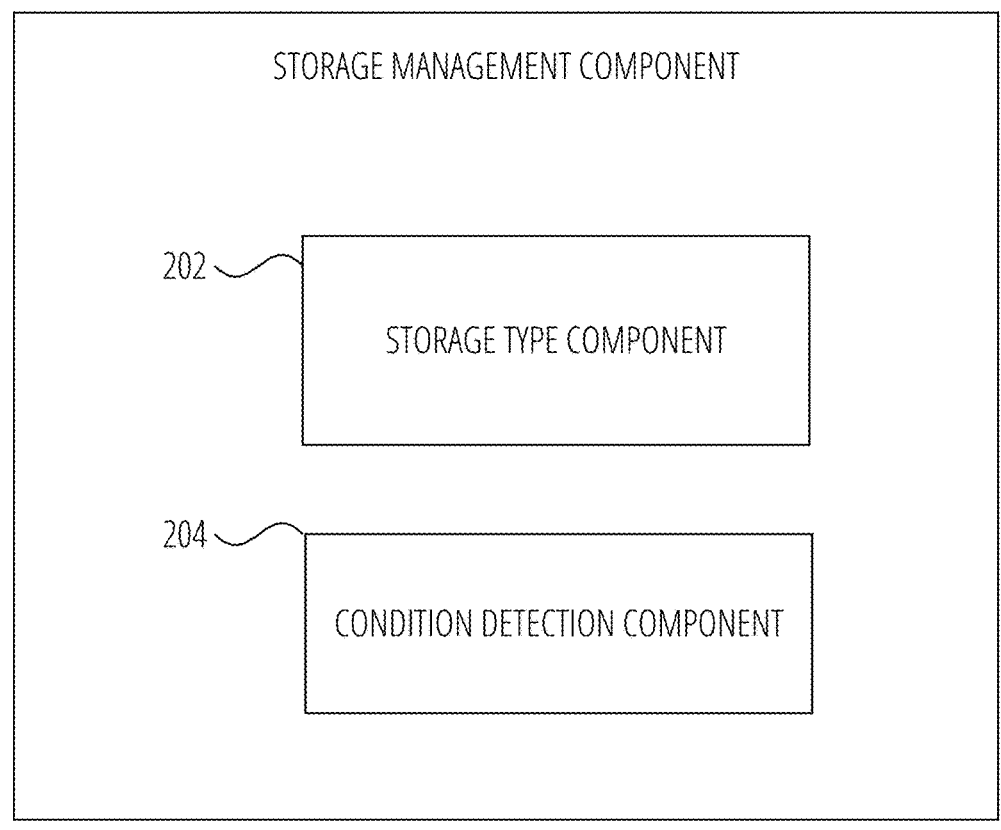
FIG. 2

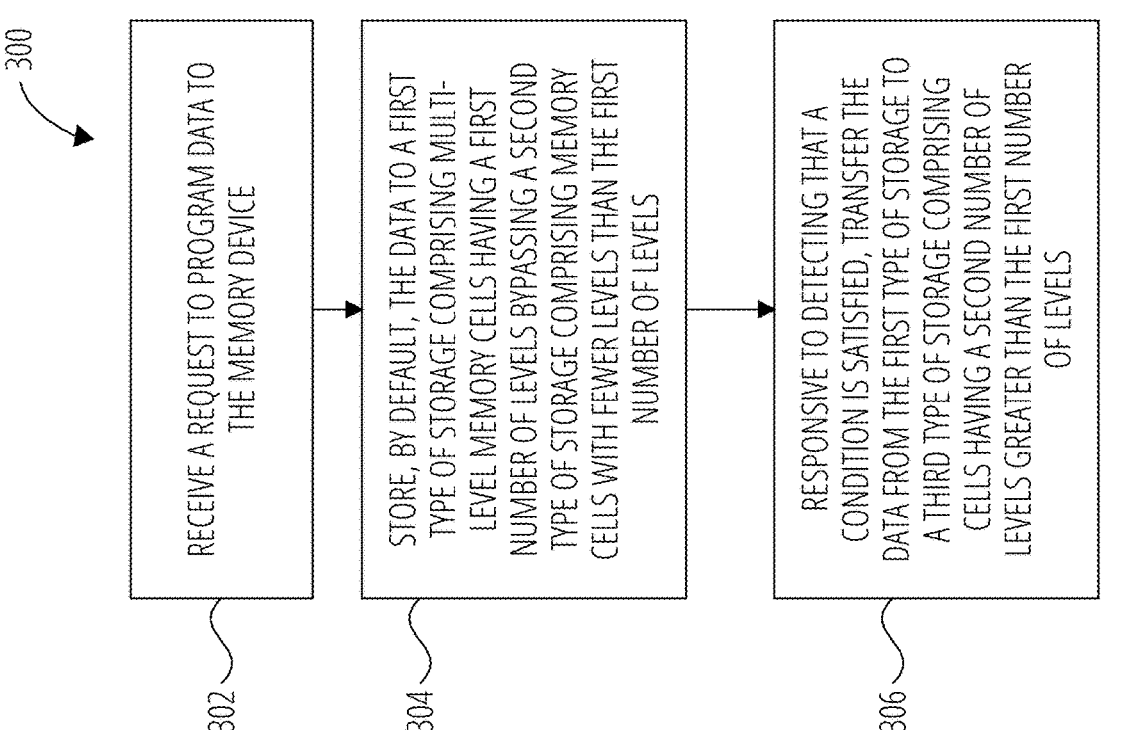

300

302 — RECEIVE A REQUEST TO PROGRAM DATA TO THE MEMORY DEVICE

304 — STORE, BY DEFAULT, THE DATA TO A FIRST TYPE OF STORAGE COMPRISING MULTI-LEVEL MEMORY CELLS HAVING A FIRST NUMBER OF LEVELS BYPASSING A SECOND TYPE OF STORAGE COMPRISING MEMORY CELLS WITH FEWER LEVELS THAN THE FIRST NUMBER OF LEVELS

306 — RESPONSIVE TO DETECTING THAT A CONDITION IS SATISFIED, TRANSFER THE DATA FROM THE FIRST TYPE OF STORAGE TO A THIRD TYPE OF STORAGE COMPRISING CELLS HAVING A SECOND NUMBER OF LEVELS GREATER THAN THE FIRST NUMBER OF LEVELS

FIG. 3

STORING DATA ON MULTI-LEVEL CELL MEMORY CELLS

TECHNICAL FIELD

Examples of the disclosure relate generally to memory sub-systems and, more specifically, to high-efficiency storage in high-capacity non-volatile solid state applications.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

FIG. 2 is a block diagram of a storage management component, in accordance with some examples.

FIG. 3 illustrates a diagram of operations performed using the storage management component, in accordance with some examples.

DETAILED DESCRIPTION

Figure 1:
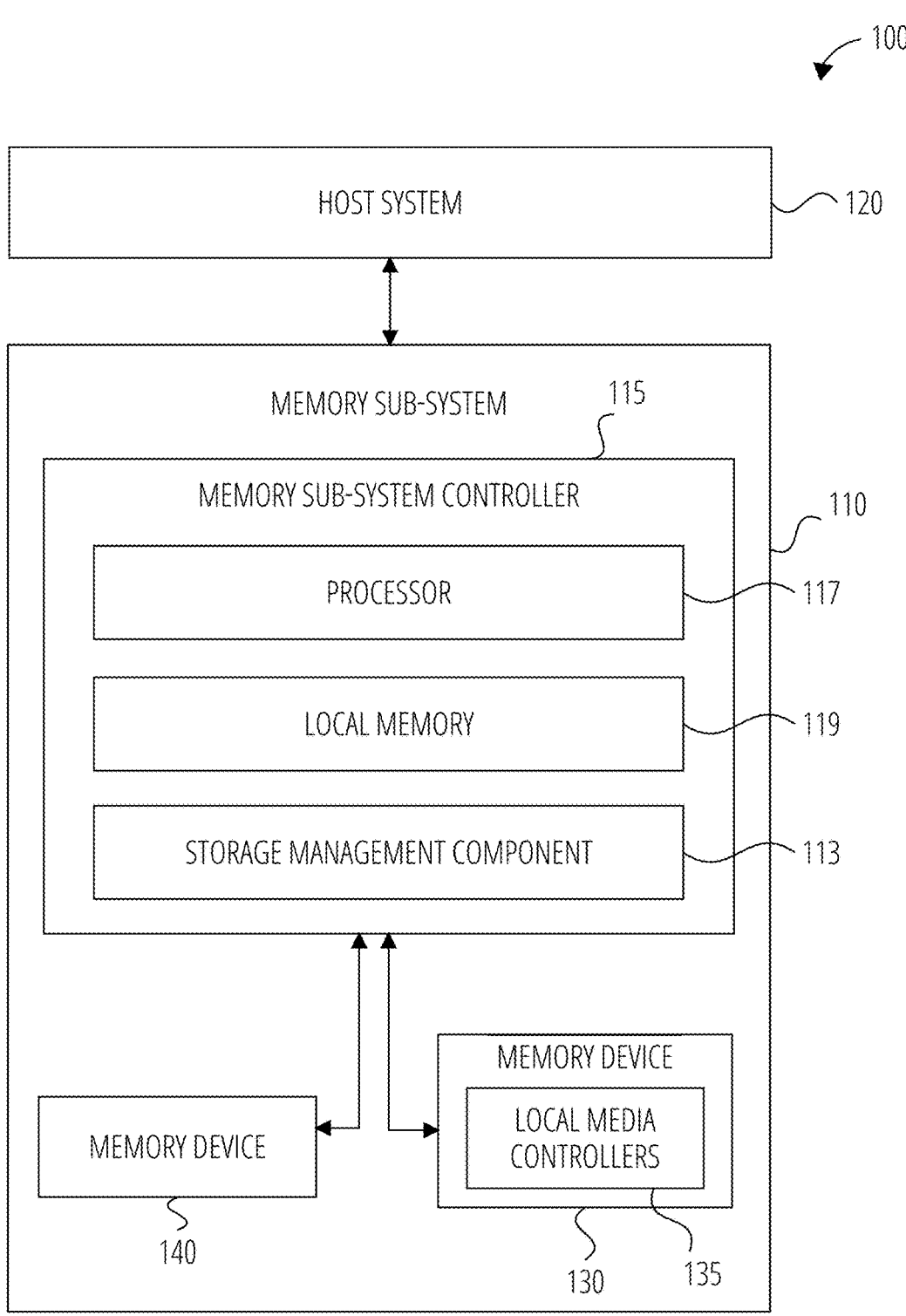
FIG. 1 is a block diagram illustrating an example computing system that includes a memory sub-system, in accordance with some examples.

The present disclosure is directed to a system including a memory device and a processing device, operatively coupled to the memory device, configured to perform operations that optimize data storage efficiency and performance. Specifically, the present disclosure is directed to a memory sub-system that, by default, stores data in a first type of storage including multi-level memory cells having a first number of levels (e.g., tri-level cell (TLC) storage), bypassing a second type of storage including memory cells with fewer levels (e.g., single-level cell (SLC) storage). Upon detecting that a predefined condition is satisfied, the system can transfer the data from the first type of storage to a third type of storage including cells having a second number of levels greater than the first number of levels (e.g., transfers the data from TLC to quad-level storage (QLC)). This dynamic management of data storage based on the portion of user logical block addresses that contain user data can significantly enhance the overall operations of the memory sub-system, such as by improving storage efficiency and performance, which can significantly improve the overall operations of the memory sub-system, such as by reducing read times.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command, erase command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection (GC) management operations. The data that is re-written, for example as initiated by the firmware, is hereinafter referred to as "GC data."

Examples of system data include, but are not limited to, system tables (e.g., logical-to-physical memory address mapping table, also referred to herein as a logical-to-physical (L2P) mapping table (referred to as an L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as word lines (WLs)), with each page comprising a subset of memory cells of the memory device. A threshold voltage (VT) of a memory cell (of a block) can be the voltage at which the floating gate (e.g., NAND transistor) implementing the memory cell turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

Conventional data storage systems that initially store data in SLC storage and later transfer the data to QLC storage face several inefficiencies. SLC storage, while offering high performance and faster access times, is significantly more expensive and has lower storage density compared to multi-level cell (MLC), TLC, or QLC storage. This approach results in an inefficient use of resources, as the high-cost SLC storage is used for data that may not require such high performance. One inefficiency arises from the additional overhead and complexity involved in transferring data from SLC to QLC storage. This process requires extra computational resources and time, as the system must identify the data to be transferred, perform the transfer operation, and update the relevant metadata. This not only increases the latency but also consumes additional power, which is particularly critical in power-sensitive applications such as mobile devices and data centers.

The initial storage of data in SLC cells can lead to rapid wear-out of these cells due to their limited program/erase (P/E) cycles. SLC cells have a higher endurance compared to QLC cells, but the frequent writing and subsequent transferring of data can accelerate their degradation, leading to reduced lifespan of the storage device. This necessitates more frequent replacements and increases the total cost of ownership. Another inefficiency is the potential for data fragmentation. When data is initially stored in SLC and then moved to QLC, it can lead to fragmented storage, where data is scattered across different types of cells. This fragmentation can degrade the overall performance of the storage system, as it requires additional read and write operations to access fragmented data, further increasing latency and reducing throughput. Moreover, the static nature of this approach does not account for the dynamic changes in data access patterns. Data that is initially categorized as hot and stored in SLC may become cold over time, and vice versa. The system's inability to dynamically adjust storage allocation based on real-time data access patterns results in suboptimal performance and resource utilization.

The present disclosure addresses these inefficiencies by providing a system that dynamically manages data storage based on predefined conditions and data usage patterns. By default, the system stores data in a first type of storage with multi-level memory cells (e.g., TLC storage), bypassing the less efficient SLC storage. Upon detecting that a predefined condition is satisfied, such as a logical saturation threshold, the system transfers the data to a third type of storage with higher density (e.g., QLC storage). This approach optimizes storage efficiency and performance, reduces read times, and ensures better utilization of storage resources, thereby overcoming the limitations of conventional data storage systems that rely on initial SLC storage followed by QLC transfer.

In some examples, the techniques described herein relate to a system having a processing device, operatively coupled to a memory device. The processing device performs the functions of receiving a request to program data to a memory device and storing the data by default in a first type of storage with multi-level memory cells having a first number of levels, bypassing a second type of storage with memory cells having fewer levels. Upon detecting that a predefined condition is satisfied, the processing device transfers the data from the first type of storage to a third type of storage with cells having a second number of levels greater than the first number of levels.

For instance, the first type of storage includes TLC memory cells, the second type of storage includes SLC memory cells, and the third type of storage includes QLC memory cells. The predefined condition can be based on a logical saturation threshold, such as 50% (or any other suitable percentage) of user logical block addresses containing user data in the first type of storage. Additionally, the processing device stores access patterns for the data stored in the first type of storage and determines whether the data includes hot data or cold data based on these access patterns. The processing device selectively transfers the data to the third type of storage based on whether the data is identified as hot or cold. For instance, data accessed at a frequency or velocity that fails to correspond to a threshold is determined to be cold data and is transferred to the third type of storage, while hot data remains in the first type of storage.

Moreover, the processing device can determine that a set of data stored in the first type of storage is associated with an age that transgresses a threshold and, in response, identify the data as cold data. The processing device then transfers the cold data to the third type of storage while retaining the remaining portion of data in the first type of storage. The system can be configured to operate in various environments, such as datacenter environments with multiple solid-state drives (SSDs) or consumer device environments. In some cases, the processing device can store additional data in the second type of storage instead of the first type of storage in response to detecting a high-speed condition, such as an asynchronous power loss (APL) or system initialization. In some cases, the memory device includes a three-dimensional (3D) NAND device. The processing device determines that configuration information associated with the memory device indicates that the memory device is to program data by default to the first type of storage instead of the second type of storage. In response, the processing device performs the above operations of storing the data by default to the first type of storage, bypassing the second type of storage.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing system 100 that includes a memory sub-system 110, in accordance with some examples. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some examples, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a SATA interface, a PCIe interface, a compute express link (CXL) interface, a USB interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, single level cells (SLCs), can store one bit per cell. Other types of memory cells, such as multi-level cells (MLCs), tri-level cells (TLCs), quad-level cells (QLCs), and penta-level cells (PLCs), can store multiple bits per cell. In some examples, each of the memory devices 130, 140 can include one or more arrays of memory cells such as SLCs, MLCs, TLCs, QLCs, or any combination of such. In some examples, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks or block stripes (BSs). As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data (e.g., performing GC operations) at the memory devices 130, 140 and other such operations. The memory sub-system controller 115 can include hardware such as one or more integrated circuits and/or discrete components, a buffer memory, or a combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some examples, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another example, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, GC operations, error detection and ECC operations, encryption operations, caching operations, and address translations between a logical address (e.g., LBA, namespace) and a physical memory address (e.g., physical block address in a physical address space of the memory device 130 or memory device 140) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some examples, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some examples, a memory device 130 is a managed memory device, which is a raw memory device combined with a local controller (e.g., local media controller 135) for media management within the same memory device package. An example of a managed memory device is a managed NAND (MNAND) device. Any operation discussed as being performed by the memory sub-system controller 115 can be similarly performed by the local media controllers 135 and vice versa.

The memory sub-system controller 115 includes a storage management component 113 that enables or facilitates the memory sub-system controller 115 to optimize data storage efficiency and performance. Specifically, the memory sub-system controller 115, by default, stores data in a first type of storage including multi-level memory cells having a first number of levels (e.g., TLC storage), bypassing a second type of storage including memory cells with fewer levels (e.g., SLC storage). Upon detecting that a predefined condition is satisfied, the memory sub-system controller 115 can transfer the data from the first type of storage to a third type of storage including cells having a second number of levels greater than the first number of levels (e.g., transfers the data from TLC to QLC). This dynamic management of data storage based on the portion of user logical block addresses that contain user data can significantly enhance the overall operations of the memory sub-system, such as by improving storage efficiency and performance, which can significantly improve the overall operations of the memory sub-system, such as by reducing read times.

Any discussion with respect to the memory device 130 can similarly be applied to the memory device 140.

FIG. 2 is a block diagram of a storage management component 113, in accordance with some examples. The storage management component 113 can include a storage type component 202 and/or a condition detection component 204. Specifically, the storage management component 113 includes several subcomponents (e.g., the storage type component 202 and the condition detection component 204) that work together to optimize data storage efficiency and performance in high-capacity non-volatile solid-state applications, such as when the memory sub-system 110 is implemented or included in one or more data centers. The storage management component 113 dynamically manages data storage based on predefined conditions and data usage patterns.

In some examples, the storage type component 202 can be responsible for determining the type of storage to be used for storing data. Specifically, by default, the storage type component 202 stores data in a first type of storage that includes multi-level memory cells having a first number of levels, such as TLC storage. This can be performed in response to the storage type component 202 receiving a request from the host system 120 to store data. The storage type component 202 accesses configuration data stored in the local memory 119 and determines, based on the configuration data, that the memory sub-system 110 is to operate in a mode where SLC storage is bypassed or skipped and data is stored automatically by default to TLC storage.

In such cases, the storage type component 202 bypasses a second type of storage that includes memory cells with fewer levels, such as SLC storage. The storage type component 202 interacts with the memory sub-system controller 115 to ensure that data is stored in the most efficient manner based on the current storage conditions and predefined criteria. The storage type component 202 communicates with the condition detection component 204 to determine whether conditions/criteria are satisfied for storing the data in the TLC and when to move the data or portions of the data from the TLC to QLC. In some cases, the condition detection component 204 instructs the storage type component 202 to automatically store additional data (e.g., configuration information, L2P tables, and other critical information) in SLC instead of TLC, such as when an APL condition is detected. Namely, the storage type component 202 can facilitate the transfer of data to a third type of storage, such as QLC storage, upon detecting that a predefined condition is satisfied.

The condition detection component 204 monitors various conditions and parameters to determine when data should be transferred from the first type of storage to the third type of storage and/or when the storage type component 202 needs to transition to storing data to the first type of storage instead of the second type of storage temporarily (e.g., while the condition continues to be satisfied, such as for the duration of the APL event). The condition detection component 204 can detect conditions based on logical saturation thresholds, access patterns, data age, and other relevant metrics. For example, the condition detection component 204 can determine that a portion of user logical block addresses (LBAs) containing user data in the first type of storage transgresses a predefined logical saturation threshold, such as 50% (or other suitable value stored in the configuration data in the local memory 119). Upon detecting that the condition is satisfied, the condition detection component 204 triggers the transfer of data from the first type of storage to the third type of storage. The condition detection component 204 works in conjunction with the storage type component 202 to ensure that data is dynamically managed and stored in the most efficient manner.

In some examples, the storage management component 113 stores access patterns for the data stored in the first type of storage and determines whether the data includes hot data or cold data based on these access patterns. The processing device selectively transfers the data to the third type of storage based on whether the data is identified as hot or cold. For instance, data accessed at a frequency or velocity that fails to correspond to a threshold is determined to be cold data and is transferred to the third type of storage, while hot data remains in the first type of storage. Moreover, the processing device determines that a set of data stored in the first type of storage is associated with an age that transgresses a threshold and, in response, identifies the data as cold data. The processing device then transfers the cold data to the third type of storage while retaining the remaining portion of data in the first type of storage. By selectively retaining hot data in the second type of storage (e.g., TLC) and moving or folding cold data to the slower third type of storage (e.g., QLC), the storage management component 113 can increase the capacity of the memory sub-system 110 with minimal overhead and cost.

The storage management component 113 is equipped with the capability to determine access patterns, velocity, and age of the data stored in the memory sub-system 110. This can be achieved through the use of timestamps and metadata stored in the LBA table entries for each block stripe. Each time data is accessed, whether read or written, the storage management component 113 updates the corresponding entry in the LBA table with a timestamp. By analyzing these timestamps, the storage management component 113 can calculate the frequency and recency of data access, thereby determining the velocity of the data. Data that is accessed frequently within a short period of time can be classified as hot data, while data with infrequent access (e.g., data that is accessed over periods of time that transgress a periodicity threshold) can be classified as cold data. Additionally, the age of the data can be determined by comparing the current time with the timestamp of the last access for a particular entry stored in the LBA table. If the age of the data exceeds a predefined threshold, the data can be identified or classified as cold. This comprehensive analysis of access patterns, velocity, and age allows the storage management component 113 to make informed decisions about dynamically transferring data between different types of storage, thereby optimizing storage efficiency and performance.

The memory sub-system 110 can be configured to operate in various environments, such as data center environments with multiple SSDs and/or consumer device environments.

The storage management component 113, which includes the storage type component 202 and the condition detection component 204, plays an important role in optimizing the performance and efficiency of the memory sub-system 110. By dynamically managing data storage based on predefined conditions and data usage patterns, the storage management component 113 ensures that the memory sub-system 110 operates at peak efficiency, reducing read times and improving overall storage performance.

The storage management component 113 is designed to improve energy efficiency and reduce power consumption. By dynamically managing data storage and reducing the need for frequent data transfers, the system minimizes the power required for storage operations. This is particularly beneficial in data center environments where power efficiency is critical, as well as in consumer devices where battery life is a concern. The storage management component 113 can help to reduce thermal loading by optimizing data storage and minimizing unnecessary data movement.

This leads to lower heat generation and improved thermal management, which is important for maintaining the reliability and longevity of the storage devices.

The storage management component 113 also extends the service life of the memory sub-system 110 by reducing wear on the NAND media. By minimizing the number of program/erase (P/E) cycles required for data storage operations, the storage management component 113 helps to preserve the integrity of the memory cells and extend the overall lifespan of the storage device.

FIG. 3 is a flow diagram of an example diagram 300 (method or process) performed using the storage management component 113, in accordance with some examples. The method or process of diagram 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method or process of diagram 300 is performed by the memory sub-system controller 115 or subcomponents of the memory sub-system controller 115 of FIG. 1. In these examples, the method or process of diagram 300 can be performed, at least in part, by the storage management component 113. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 3, the method or process of diagram 300 begin at operation 302, with the storage management component 113 of a memory sub-system 110 (e.g., memory device 140) receiving a request to program data to a memory device, such as from a host system 120. Then, at operation 304, the storage management component 113 stores, by default, the data to a first type of storage including multi-level memory cells having a first number of levels bypassing a second type of storage including memory cells with fewer levels than the first number of levels. At operation 306, responsive to detecting that a condition is satisfied, the storage management component 113 transfers the data from the first type of storage to a third type of storage comprising cells having a second number of levels greater than the first number of levels.

Figure 4:
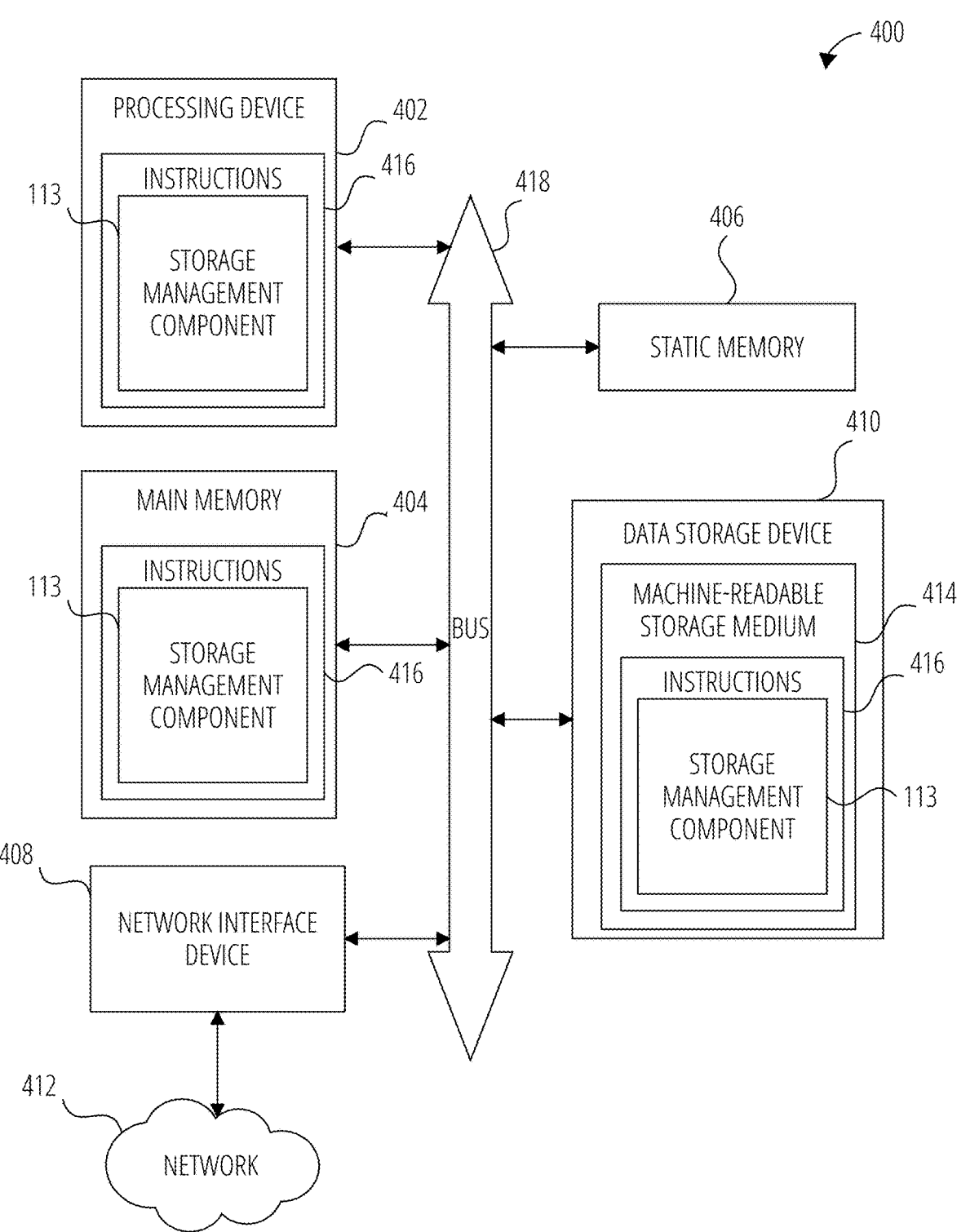
FIG. 4 is a block diagram of an example computer system, according to some examples.

FIG. 4 illustrates an example machine in the form of a computer system 400 within which a set of instructions can be executed for causing the machine to perform any one or more of the methodologies discussed herein. In some examples, the computer system 400 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., ROM, flash memory, DRAM such as SDRAM or Rambus DRAM (RDRAM), etc.), a static memory 406 (e.g., flash memory, static random access memory (SRAM), etc.), and a data storage device 410, which communicate with each other via a bus 418.

The processing device 402 represents one or more general-purpose processing devices such as a microprocessor, a central processing unit, or the like. More particularly, the processing device 402 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 402 can also be one or more special-purpose processing devices such as an application-specific integrated circuit (ASIC), a field programmable gate array (FPGA), a digital signal processor (DSP), a network processor, or the like. The processing device 402 is configured to execute instructions 416 for performing the operations and steps discussed herein. The computer system 400 can further include a network interface device 408 to communicate over a network 412.

The data storage device 410 can include a machine-readable storage medium 414 (also known as a computer-readable medium) on which is stored one or more sets of instructions 416 or software embodying any one or more of the methodologies or functions described herein. The instructions 416 can also reside, completely or at least partially, within the main memory 404 and/or within the processing device 402 during execution thereof by the computer system 400, the main memory 404 and the processing device 402 also constituting machine-readable storage media. The machine-readable storage medium 414, data storage device 410, and/or main memory 404 can correspond to the memory sub-system 110 of FIG. 1.

In one example, the instructions 416 include instructions to implement functionality corresponding to providing block failure protection for a zone memory sub-system as described herein (e.g., the storage management component 113 of FIG. 1). While the machine-readable storage medium 414 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1: A system comprising a memory device and a processing device, operatively coupled to the memory device, configured to perform operations. The operations include receiving a request to program data to the memory device, storing, by default, the data to a first type of storage comprising multi-level memory cells having a first number of levels, and bypassing a second type of storage comprising memory cells with fewer levels than the first number of levels. Upon detecting that a condition is satisfied, the system transfers the data from the first type of storage to a third type of storage comprising cells having a second number of levels greater than the first number of levels.

Example 2: The system of Example 1, wherein the first type of storage comprises triple-level cell (TLC) memory cells, the second type of storage comprises single-level cell (SLC) memory cells, and the third type of storage comprises quad-level cell (QLC) memory cells.

Example 3: The system of any of Examples 1-2, wherein the condition is based on a predefined logical saturation threshold.

Example 4: The system of any of Examples 1-3, wherein the operations further include accessing configuration data that specifies the predefined logical saturation threshold, determining that a portion of user logical block addresses that contain user data in the first type of storage transgresses the predefined logical saturation threshold, and in response to determining that the portion of user logical block addresses that contain user data in the first type of storage transgresses the predefined logical saturation threshold, detecting that the condition is satisfied.

Example 5: The system of any of Examples 1-4, wherein the logical saturation threshold is configurable.

Example 6: The system of any of Examples 1-5, wherein the operations further include storing access patterns for the data stored in the first type of storage, determining whether the data includes hot data or cold data based on the access patterns, and selectively transferring the data to the third type of storage based on determining whether the data includes the hot data or the cold data based on the access patterns.

Example 7: The system of any of Examples 1-6, wherein the operations further include determining that a set of data stored in the first type of storage is accessed at a frequency or velocity that fails to correspond to a threshold, and in response to determining that the set of data stored in the first type of storage is accessed at the frequency or velocity that fails to correspond to the threshold, determining that the set of data comprises cold data.

Example 8: The system of any of Examples 1-7, wherein the operations further include transferring the cold data to the third type of storage while retaining a remaining portion of data in the first type of storage.

Example 9: The system of any of Examples 1-8, wherein the operations further include determining that a second set of data stored in the first type of storage is accessed at a frequency or velocity that transgresses the threshold, and in response to determining that the second set of data stored in the first type of storage is accessed at the frequency or velocity that transgresses the threshold, determining that the set of data comprises hot data, the remaining portion comprising the hot data.

Example 10: The system of any of Examples 1-9, wherein the operations further include determining that a set of data stored in the first type of storage is associated with an age that transgresses a threshold, and in response to determining that the set of data stored in the first type of storage is associated with the age that transgresses the threshold, determining that the set of data comprises cold data.

Example 11: The system of any of Examples 1-10, wherein the operations further include transferring the cold data to the third type of storage while retaining a remaining portion of data in the first type of storage.

Example 12: The system of any of Examples 1-11, wherein the system is configured to operate in a datacenter environment with multiple solid-state drives.

Example 13: The system of any of Examples 1-12, wherein the system is configured to operate in a consumer device environment.

Example 14: The system of any of Examples 1-13, wherein the operations further include storing additional data in the second type of storage instead of the first type of storage in response to detecting a high-speed condition.

Example 15: The system of Example 14, wherein the high-speed condition comprises an asynchronous power loss (APL).

Example 16: The system of Example 14, wherein the high-speed condition comprises initialization of the system.

Example 17: The system of any of Examples 1-16, wherein the memory device comprises a three-dimensional (3D) NAND device.

Example 18: The system of any of Examples 1-17, wherein the operations further include determining that configuration information associated with the memory device indicates that the memory device is to program data by default to the first type of storage instead of the second type of storage.

Example 19: At least one non-transitory machine-readable storage medium comprising instructions that, when executed by a processing device, cause the processing device to perform operations comprising receiving a request to program data to the memory device, storing, by default, the data to a first type of storage comprising multi-level memory cells having a first number of levels bypassing a second type of storage comprising memory cells with fewer levels than the first number of levels, and responsive to detecting that a condition is satisfied, transferring the data from the first type of storage to a third type of storage comprising cells having a second number of levels greater than the first number of levels.

Example 20: A method comprising receiving a request to program data to the memory device, storing, by default, the data to a first type of storage comprising multi-level memory cells having a first number of levels bypassing a second type of storage comprising memory cells with fewer levels than the first number of levels, and responsive to detecting that a condition is satisfied, transferring the data from the first type of storage to a third type of storage comprising cells having a second number of levels greater than the first number of levels.

The term "coupled with" generally refers to a connection between components, which can be an indirect communicative connection or direct communicative connection (e.g., without intervening components), whether wired or wireless, including connections such as electrical, optical, magnetic, and the like.

"System data" hereinafter refers to data that is created and/or maintained by the memory sub-system for performing operations in response to host requests and for media management.

"User data" hereinafter generally refers to host data and garbage collection data.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, examples of the disclosure have been described with reference to specific examples thereof. It will be evident that various modifications can be made thereto without departing from the broader scope of examples of the disclosure as set forth in the following claims. The specification and drawings are, accordingly, to be regarded in an illustrative sense rather than a restrictive sense.

The invention claimed is:

1. A system comprising:

a memory device; and a processing device, operatively coupled to the memory device, configured to perform operations comprising:

receiving a request to program data to the memory device;

storing, by default, the data to a first type of storage comprising multi-level memory cells having a first number of levels bypassing a second type of storage comprising memory cells with fewer levels than the first number of levels; and responsive to detecting that a condition is satisfied, transferring the data from the first type of storage to a third type of storage comprising cells having a second number of levels greater than the first number of levels.

2. The system of claim 1, wherein the first type of storage comprises triple-level cell (TLC) memory cells, wherein the second type of storage comprises single-level cell (SLC) memory cells, and wherein the third type of storage comprises quad-level cell (QLC) memory cells.

3. The system of claim 1, wherein the condition is based on a predefined logical saturation threshold.

4. The system of claim 3, the operations comprising:

accessing configuration data that specifies the predefined logical saturation threshold;

determining that a portion of user logical block addresses that contain user data in the first type of storage transgresses the predefined logical saturation threshold; and in response to determining that the portion of user logical block addresses that contain user data in the first type of storage transgresses the predefined logical saturation threshold, detecting that the condition is satisfied.

5. The system of claim 4, wherein the predefined logical saturation threshold is configurable.

6. The system of claim 1, the operations comprising:

storing access patterns for the data stored in the first type of storage;

determining whether the data includes hot data or cold data based on the access patterns; and selectively transferring the data to the third type of storage based on determining whether the data includes the hot data or the cold data based on the access patterns.

7. The system of claim 6, the operations comprising:

determining that a set of data stored in the first type of storage is accessed at a frequency or velocity that fails to correspond to a threshold; and in response to determining that the set of data stored in the first type of storage is accessed at the frequency or velocity that fails to correspond to the threshold, determining that the set of data comprises the cold data.

8. The system of claim 7, the operations comprising:

transferring the cold data to the third type of storage while retaining a remaining portion of the data in the first type of storage.

9. The system of claim 8, the operations comprising:

determining that a second set of data stored in the first type of storage is accessed at a second frequency or velocity that transgresses the threshold; and in response to determining that the second set of data stored in the first type of storage is accessed at the frequency or velocity that transgresses the threshold, determining that the set of data comprises the hot data, the remaining portion comprising the hot data.

10. The system of claim 6, the operations comprising:

determining that a set of data stored in the first type of storage is associated with an age that transgresses a threshold; and in response to determining that the set of data stored in the first type of storage is associated with the age that transgresses the threshold, determining that the set of data comprises the cold data.

11. The system of claim 10, the operations comprising:

transferring the cold data to the third type of storage while retaining a remaining portion of the data in the first type of storage.

12. The system of claim 1, wherein the system is configured to operate in a datacenter environment with multiple solid-state drives.

13. The system of claim 1, wherein the system is configured to operate in a consumer device environment.

14. The system of claim 1, the operations comprising:

storing additional data in the second type of storage instead of the first type of storage in response to detecting a high-speed condition.

15. The system of claim 14, wherein the high-speed condition comprises an asynchronous power loss (APL).

16. The system of claim 14, wherein the high-speed condition comprises initialization of the system.

17. The system of claim 1, wherein the memory device comprises a three-dimensional (3D) NAND device.

18. The system of claim 1, the operations comprising:

determining that configuration information associated with the memory device indicates that the memory device is to program data by default to the first type of storage instead of the second type of storage.

19. At least one non-transitory machine-readable storage medium comprising instructions that, when executed by a processing device, cause the processing device to perform operations comprising:

receiving a request to program data to a memory device;

storing, by default, the data to a first type of storage comprising multi-level memory cells having a first number of levels bypassing a second type of storage comprising memory cells with fewer levels than the first number of levels; and responsive to detecting that a condition is satisfied, transferring the data from the first type of storage to a third type of storage comprising cells having a second number of levels greater than the first number of levels.

20. A method comprising:

receiving a request to program data to a memory device;

storing, by default, the data to a first type of storage comprising multi-level memory cells having a first number of levels bypassing a second type of storage comprising memory cells with fewer levels than the first number of levels; and responsive to detecting that a condition is satisfied, transferring the data from the first type of storage to a third type of storage comprising cells having a second number of levels greater than the first number of levels.

* * * * *